United States Patent [19]

Woltmann

[11] Patent Number: 5,397,463
[45] Date of Patent: Mar. 14, 1995

[54] AEROBIC AQUARIUM FILTER CHAMBER

[75] Inventor: Klaus Woltmann, Demarest, N.J.

[73] Assignee: Warner-Lambert Company, Morris Plains, N.J.

[21] Appl. No.: 136,116

[22] Filed: Oct. 13, 1993

[51] Int. Cl.⁶ .............................................. A01K 63/04
[52] U.S. Cl. .................................. 210/151; 210/169; 210/195.1; 210/196; 210/416.2; 210/418; 119/260
[58] Field of Search ............ 210/150, 151, 169, 195.1, 210/416.2, 196, 299, 300, 302, 418, 472; 119/259, 260, 261

[56] References Cited

U.S. PATENT DOCUMENTS

| | | | |
|---|---|---|---|
| 3,774,766 | 11/1973 | Brock | 210/169 |
| 4,512,885 | 4/1985 | Willinger | 210/169 |
| 4,735,715 | 4/1993 | Willinger | 210/169 |
| 5,108,594 | 4/1992 | Giovanetti et al. | 210/169 |
| 5,160,622 | 11/1992 | Gunderson et al. | 210/169 |
| 5,176,824 | 1/1993 | Willinger | 210/169 |
| 5,242,582 | 9/1993 | Marioni | 210/169 |

Primary Examiner—Robert A. Dawson
Assistant Examiner—Robert James Popovics
Attorney, Agent, or Firm—Helfgott & Karas

[57] ABSTRACT

A combination of a physical filter and aerobic filter positioned entirely on the outside of an aquarium tank. Water is pumped into the physical filter chamber and upon reaching a level above the chamber walls of the physical filter it spills by gravity flow to both an aerobic filter also contained within the housing and back into the aquarium tank. The water entering the aerobic filter is filtered and passed back to the physical filter where the filtering is repeated.

15 Claims, 5 Drawing Sheets

AEROBIC AQUARIUM FILTER CHAMBER

BACKGROUND OF THE INVENTION

1. Field of the Invention

The invention relates generally to aquarium filtration and, more particularly, to a combination physical and aerobic filter.

2. Description of the Prior Art

To combat the problem of toxic waste build-up, three types of filtration approaches are generally utilized. One approach is physical filtration wherein the suspended waste material is physically trapped by mechanical filters. The filters utilize filtration material in the form of fluffy masses of synthetic resin fibers. Sand or gravel beds are also utilized for physical filtration in undergravel type of filters.

The second well known type of filtration is chemical filtration which relates to the removal of or deactivation of mostly organics. Activated carbon and ion exchange resins are commonly used materials for chemical filtration. While the above forms of filtration are well known and frequently utilized, they are generally insufficient for purifying the water and eliminating some of the common known toxic waste products of the aquatic animals themselves.

The third type of filtration which is probably the most important and yet often least utilized, is that of biological filtration. Such biological filtration is accomplished by means of living organisms, primarily bacteria. In an aquarium the aerobic filtration is important since it serves to rid the tank of toxic ammonia.

The aerobic nitrifying bacteria have two basic requirements to carry out their functions. The first is a need for adequate oxygen. The second is that they require a place to attach themselves.

Prior art filters which provided enhanced aerobic filtration were complex, large and expensive devices. These filters referred to as wet/dry filters include a chamber providing mechanical filtration, being the wet part, and an aerobic chamber being the dry part because of the large amounts of oxygen within the aerobic chamber. One such filter is U.S. Pat. No. 3,774,766 dated Nov. 27, 1973 disclosing a filter which uses siphon tubes to remove water from the tank and a pump to return filtered water back inside the tank. This device is adapted to be placed on the outside of the aquarium tank. This filter requires a siphon to draw aquarium water into the primary filter and a pump to pump the aerobically filtered water back into the aquarium. As a result, the filter requires a balance between the input to the filter and the output of the filter to avoid either overflowing the aerobic chamber or not having sufficient water for the pump returning the water to the aquarium to operate efficiently. It also requires collection of the water dripping through the aerobic chamber to prove an adequate amount to support the return pumping of the water to the aquarium. The filter is not adaptable to use with a gravity return mechanism but uses a pump to return the water. The unit further does not have any safeguard in case the pump should clog and water overfill the chambers.

U.S. Pat. No. 5,176,824 dated Jan. 5, 1993, and assigned to the present assignee discloses an improved wet/dry filter which uses a gravity return through a slit in the bottom of the chamber and a single impeller pump to pump the water into the filter. The aerobic filter must be positioned within or above the aquarium tank. The filter must rest at a height above the water level and yet must be high enough to allow the water to trickle down through aerobic medium for proper filtering.

While previous filters have provided primary and aerobic filtration, still further enhancement and improvement are useful. It would be desirable if such a filter would be positioned completely outside the aquarium tank so that it can be easily cleaned and need not be positioned above the water level in the tank. It should also be able to have a large area for aerobic filtration, a single pump means for the flow of water into the tube and a gravity return into the aquarium tank. These and other advantages are accomplished by the present invention as will be further described in the following description.

SUMMARY OF THE INVENTION

Accordingly it is an object of the present invention to provide an improved combination wet/dry filter.

A further object of the present invention is to provide a combination wet/dry filter which is positioned entirely outside the aquarium tank.

A still further object of the present invention is to provide a combination wet/dry filter which may recirculate water through the filters many times to provide added filtration.

Still another object of the present invention is to provide the filtered water back to the aquarium using a gravity return.

Another object of the present invention is to provide a double path for filtered water to flow, from the physical chamber to both the aquarium tank and the aerobic filter.

Still another object of the present invention is to avoid spillage of water and overflow of the filter.

Briefly, in accordance with the present invention, a wet/dry filter is provided for filtration of aquarium water. The wet chamber houses a physical filter in the form of a coarse sponge and a filter cartridge. The aerobic filter houses media on which aerobic bacteria may attach themselves. The combination filter is positioned entirely outside the aquarium tank and specifically on the exterior thereof, and returns the filtered water to the tank through a gravity return, thus eliminating the possibility of overflowing the filter and spilling water outside the aquarium tank.

In operation, water is drawn from the aquarium tank into the filter by a pumping mechanism. The water is delivered through a flow tube to a physical filter chamber in the filter housing. As the physical filter chamber fills, the water passes through a physical filter. As the water reaches the top of the physical filter chamber it reaches two spillways. One delivers the water back to the aquarium tank and the other delivers it into an aerobic filter chamber within the filter housing. The water delivered to the aerobic filter chamber trickles through the aerobic filter medium and fills the aerobic chamber. As the level of water rises in the aerobic filter chamber, a floating collar on the flow tube is caused to rise thereby exposing a hole in the flow tube. The water in the aerobic chamber enters the flow tube joining the water drawn from the aquarium tank and the combined flow of water continues to the physical filter chamber where the process repeats.

In an embodiment of the invention, the aerobic chamber comprises an inner chamber housing, aerobic filter media and an outer chamber in which the flow tube is positioned, the water from the inner chamber flows into the outer chamber.

DESCRIPTION OF THE PREFERRED EMBODIMENT

Figure 1:
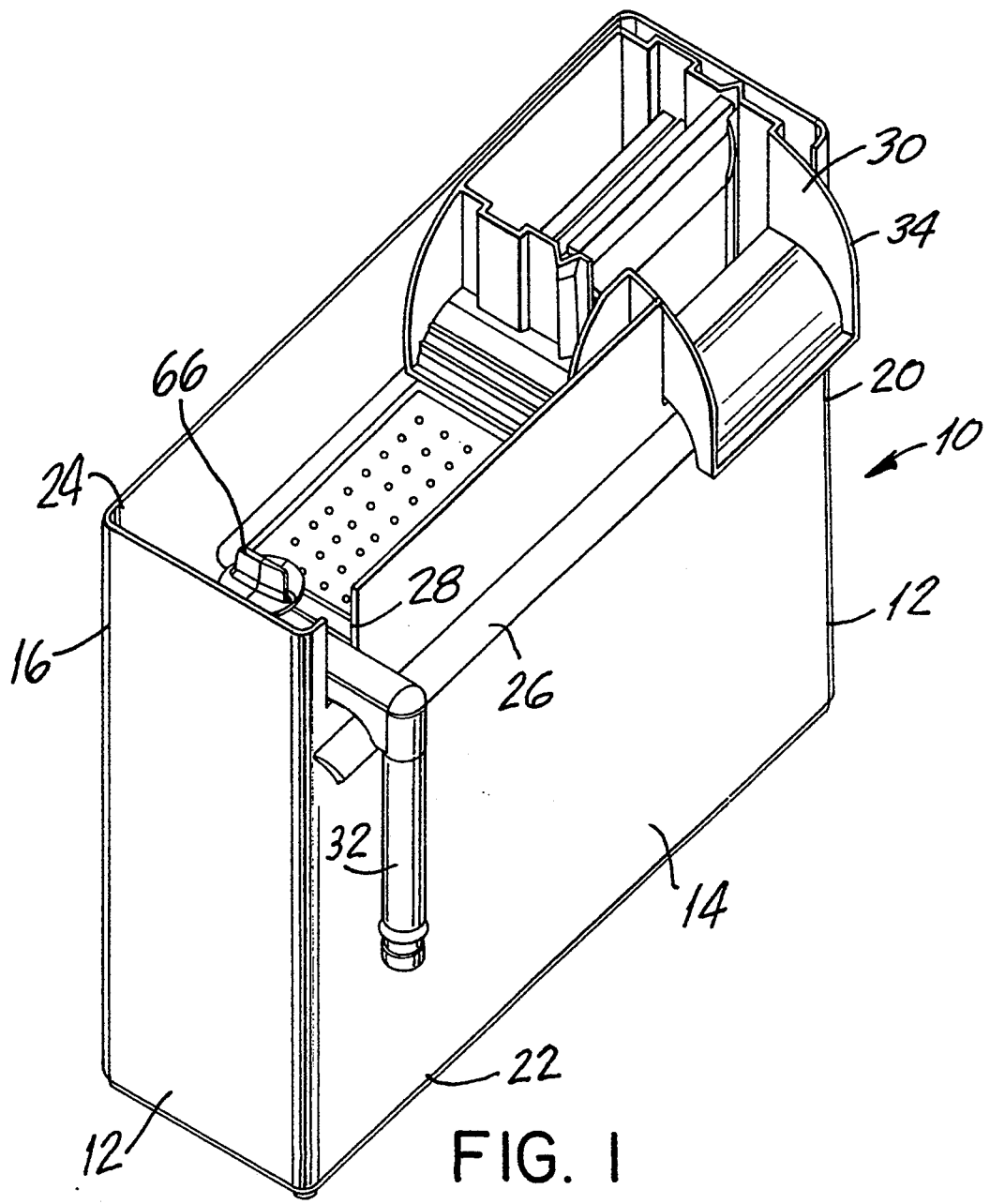
FIG. 1 is a perspective view of the combination wet/dry filter of the present invention.

Referring now to FIG. 1, there is shown an aquarium filter assembly designated generally by the numeral 10. The assembly is enclosed in an outer housing 12. The outer housing 12 has front and rear opposing sides 14 and 16, left and right opposing sides 18 and 20 and a base wall 22. The top side 24 is open. The front side 14 has a protrusion 26 extending horizontally across its width. The front side 14 also has two recesses 28 and 30 on a top part and on opposite ends thereof. Extending from inside the housing 12 and through the recess 28 is an intake tube 32. Extending through the recess 30 is a spillway 34.

Figure 3:
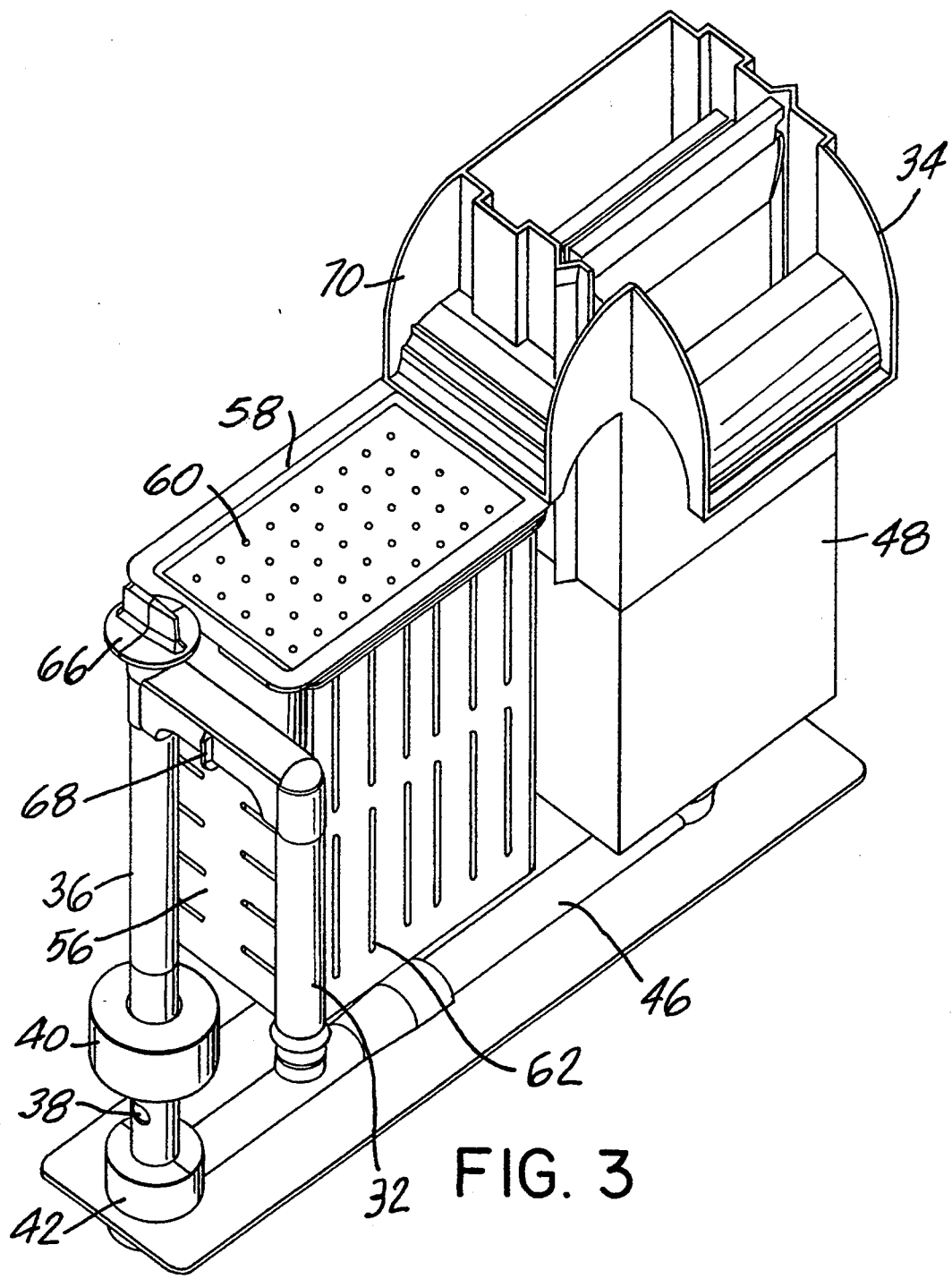
FIG. 3 is a perspective view of the filter of FIG. 1 without the outer housing.
Figure 5:
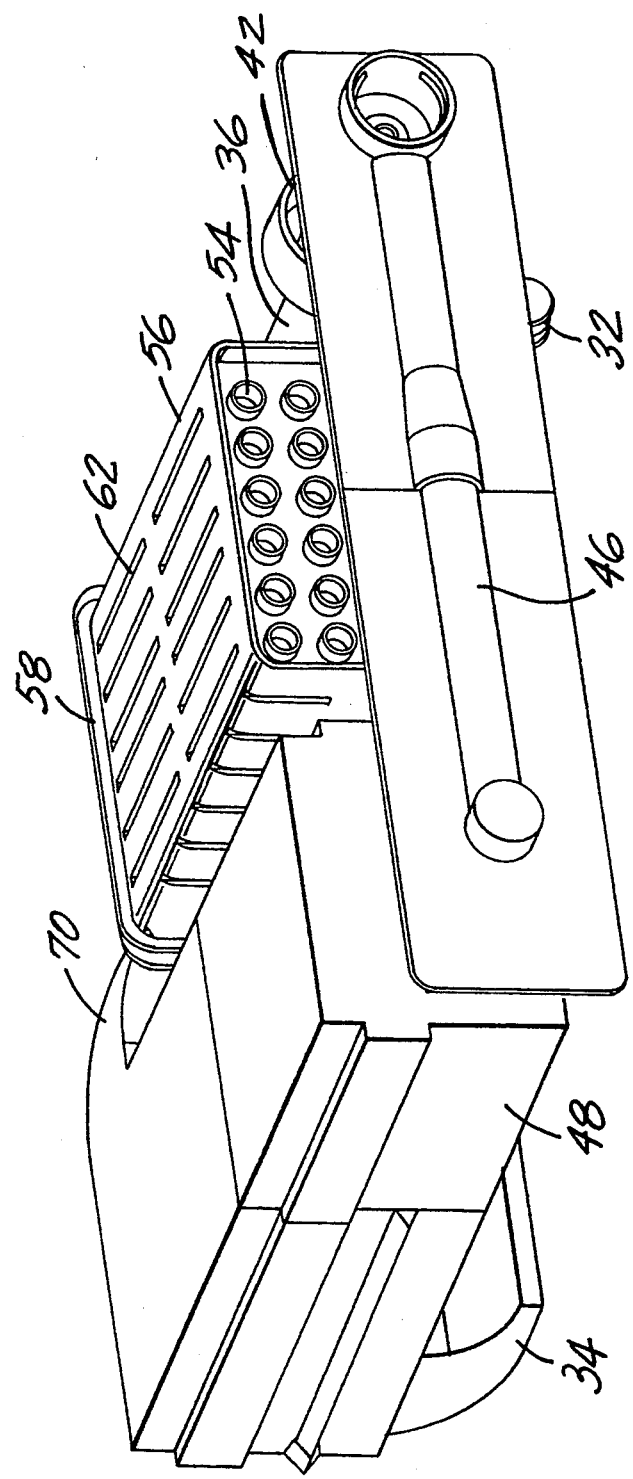
FIG. 5 is a perspective view from the bottom of the filter of FIG. 1 without the outer housing.

As shown in FIGS. 3 and 5, the housing 12 encloses a flow tube 36, attached to the intake tube 32, having a through hole 38 at a bottom side thereof. A floating collar 40 fits around the flow tube 36 and is slidably mounted thereon. At the base of the flow tube 36 is an impeller housing indicated generally by the number 42. Connected to the opposite side of the impeller housing 42 is an energizer 44. The energizer and impeller are of known construction and are fully explained in U.S. Pat. No. 4,735,715, dated Apr. 5, 1988 of which the assignee is the same as the present invention. Also attached to the flow tube 36 is a passageway 46. The flow tube 36 is connected to the passageway at a point below the through hole 38 at the output of the impeller 42. The passageway 46 connects the flow tube 36 to a wet chamber 48. Contained within the wet chamber 48 is a filter which may consist of any or all of a strainer 50, a coarse sponge 52 and Bio Bag ® filter 54. The Bio Bag ® filter 54 is an example of a filter cartridge which may be used. Located between the wet chamber 48 and the flow tube 36 is an aerobic filter referred to as a dry chamber 56. A second spillway 70 exists between the wet chamber 48 and the dry chamber 56 and is located above the top surface of the dry chamber 56. On top of the dry chamber 56 is a drip tray 58. The drip tray 58 contains a number of holes 60. Along the side walls of the dry chamber 56 are openings or slits 62. Within the dry chamber 56 is a medium for supporting aerobic bacterial growth 72, an example of such is thermoplastic tubules. Through holes 64 are also along the bottom side of the dry chamber 56. At a point between the intake tube 32 and the flow tube 36 is a valve 66. Also between the intake tube 32 and the flow tube 36 is a steadying device 68.

Figure 2:
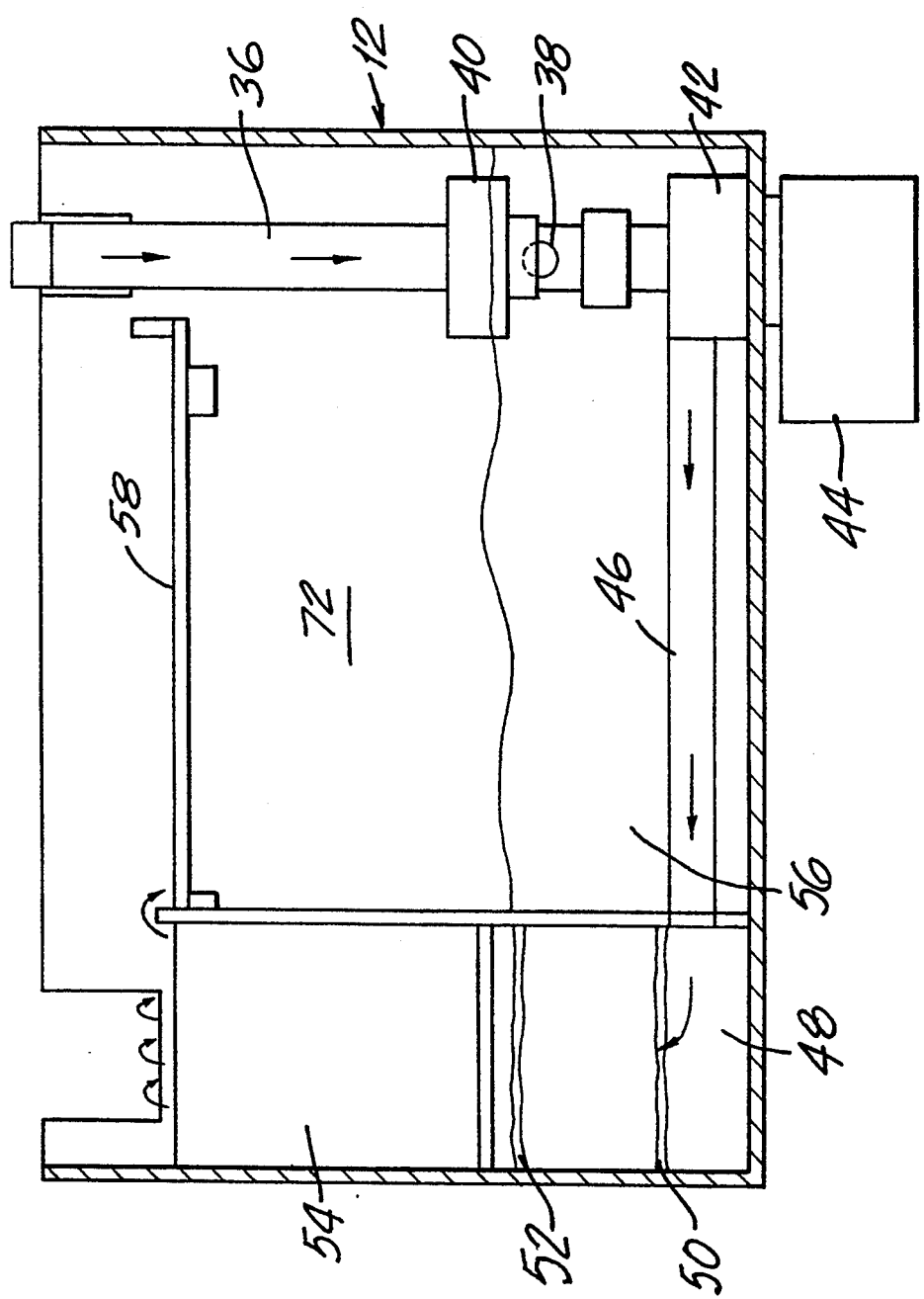
FIG. 2 illustrates the flow path of the aquarium water through the combination wet/dry filter of the present invention.
Figure 4:
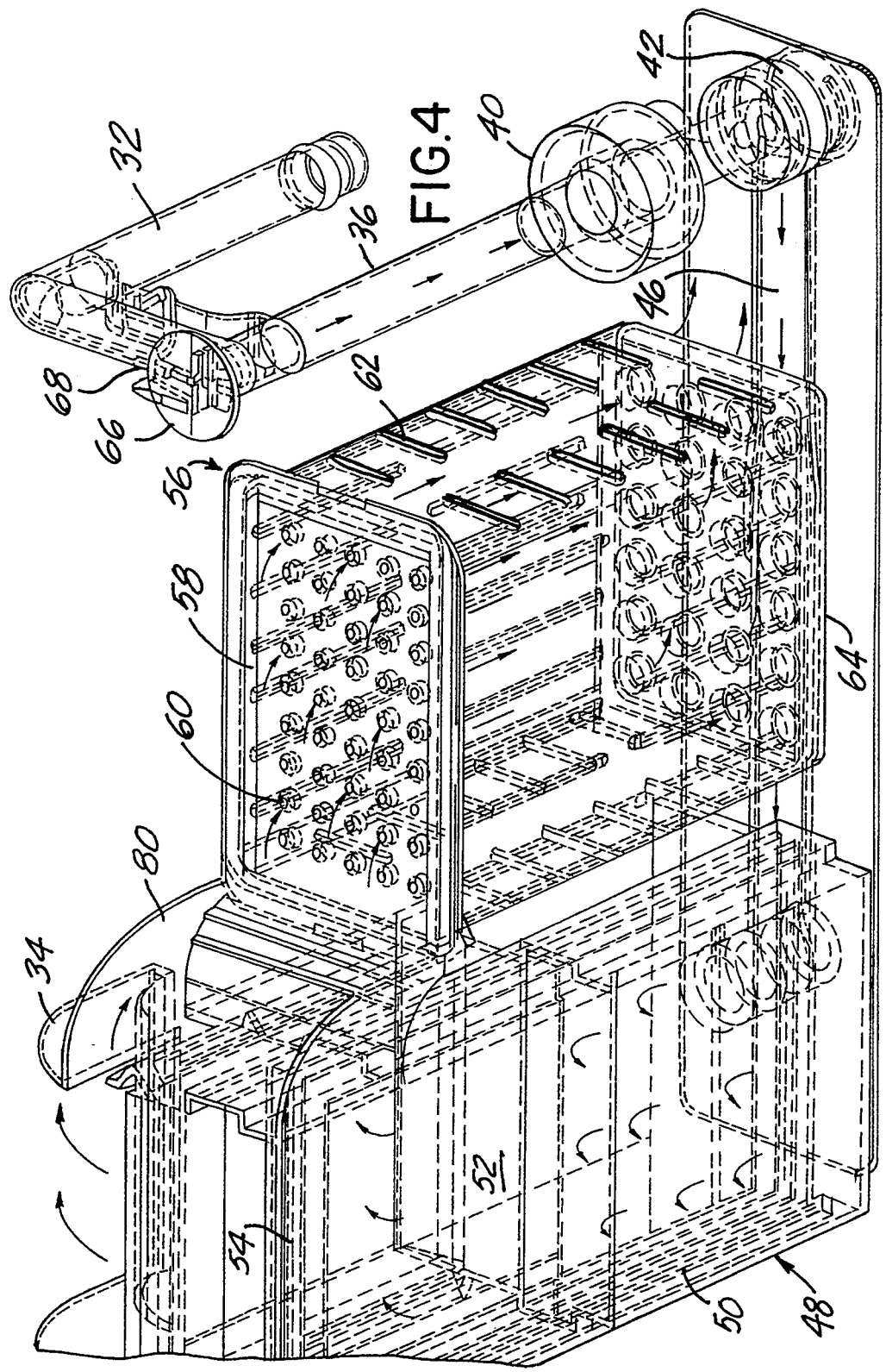
FIG. 4 is a more detailed view of the filter of FIG. 3 illustrating the flow path of the water through the filters.

Operation of this assembly will now be discussed with reference to FIGS. 2 and 4. The filter assembly is placed on the outside of an aquarium tank and is held there by the protrusion 26 extending horizontally along the outside of the filter housing 12. The intake tube 32 rests within the water filling the aquarium tank and a spillway 34 extends over the wall of the aquarium tank and sits over the tank. The intake tube 32 is held in place by a steadying device 68.

When the energizer 44 is turned on the impeller device within housing 42 is caused to rotate causing water to be drawn from the aquarium tank into the intake tube 32. Operation of the energizer 44 and impeller device are also discussed in U.S. Pat. No. 4,735,715 dated Apr. 5, 1988. The amount of water drawn into the intake tube 32 is regulated by a valve 66 at the top of the tube 32. The water drawn into the intake tube 32 flows through the flow tube 36, passes by the impeller device and through the passageway 46 into the wet chamber 48.

As more water passes into the wet chamber 48, the wet chamber 48 begins to fill up. The water level in the wet chamber 48 thus rises forcing the water to pass through a strainer 50, a coarse sponge 52 and a filter cartridge 54. The water has thus been physically filtered. Once the water level reaches the top of the wet chamber 48 it leaves the chamber through both spillways 34 and 70. The first spillway 34 delivers the water back to the aquarium tank. The second spillway 70 deposits the water on the top of a dry chamber 58. Covering the dry chamber 58 is a drip tray 60. The drip tray 60 disperses the flow of water into the dry chamber 58 and produces an even trickling of water across the entire dry chamber 58. The water passing into the dry chamber 58 flows over an aerobic support medium 72 such as thermoplastic tubules. On this medium 72, bacteria are allowed to grow. The presence of these bacteria serves to rid the tank of toxic ammonia. Filtration by such means is known and discussed in U.S. Pat. No. 5,176,824 dated Jan. 5, 1993 and previously referenced. The aerobic filter chamber may also be formed with multiple internal walls interconnected to produce circuitous paths and grooves. This provides an increased surface area on which the bacteria can attach.

As the water flows over the media it passes out of the dry chamber 58, through the holes 64 along its base, and into the outer housing 12. The outer housing 12 is adapted to hold the water. As the water level rises within the outer housing 12, the floating collar 40 around the flow tube 36 is buoyed by the water level and caused to rise. As the floating collar 40 rises it exposes the through hole 38 in the flow tube 36. Lowering of the collar covers more of the hole 38 to reduce the flow of water. During operation of the filter, the collar 40 generally reaches an equilibrium position with respect to the hole 38. This position is generally mounted unless a blockage or other problem may occur.

The water within the outer housing 12 enters the flow tube 36 through this hole 38 and is mixed with the water being pumped from the aquarium tank through the passageway 46 into the wet chamber 48. The water is thus filtered in the wet chamber 48 and passes back over the first spillway 34 and into the aquarium tank and over the second spillway 70 into the dry chamber 58. This process is repeated continuously as long as the filter is in operation. The slits 62 are available to expose the aerobic medium to air.

Because this entire filter is adapted for placement on the outside of an aquarium tank many of the limitations encountered with previous filters are eliminated. Restraints on previous filters included a limitation on the height of the aerobic filter while still retaining a gravity return of water back to the aquarium tank. These filters, to retain a gravity return, had to be positioned inside the aquarium tank and above the water level within the tank. Previous filters providing aerobic filtration, if located outside the aquarium tank, were unable to employ a gravity return and needed a second pump to return the water to the aquarium tank. The filter of the present invention takes advantage of a gravity return on the filter and uses a pumping device for delivering water to this filter. Furthermore, this filter removes the prior art restraints on the size of the aerobic filter. This permits the aerobic filter to house more media for supporting bacteria growth and this can better aerobically filter the water.

Having the entire filter on the outside of the aquarium tank also provides for ease in changing the filters. Once the energizer is turned off all the excess water in the chamber is allowed to spill over into the tank. The remaining water in the tank is secure and the filter can be removed from the tank by simply lifting it up. Since the filter rests completely outside the aquarium tank, no disruption of the inside of the tank occurs. Once the filters are changed the entire filter may be placed back on the aquarium tank.

There has been described a preferred embodiment of the invention. However, it should be understood that various changes and modifications may be made thereto without departing from the spirit and scope of the invention.

I claim:

1. A combined physical filter and aerobic filter contained in a single housing for physical and biological filtration of contaminated aquarium water in an aquarium tank, comprising:
    a filtering chamber containing means for physical filtration of aquarium water, said filtering chamber having first and second spillways positioned on a top side thereof through which filtered water overflowing the filtering chamber exits by gravity flow;
    pump means for pumping contaminated water from the aquarium tank into said filtering chamber;
    an aerobic chamber containing a medium supporting aerobic bacterial growth and positioned to receive the filtered water exiting the first spillway;
    means for delivering water exiting the aerobic chamber directly back to the filtering chamber, the means for delivering being positioned within the housing;
    means for attaching the combined filter to an exterior side wall of the aquarium tank positioning the second spillway to overhang the exterior side wall of the aquarium tank thereby delivering the filtered water exiting the filtering chamber back to the aquarium tank by gravity flow.

2. The filter of claim 1, wherein the pump means includes:
    an inlet pipe having a hole in a base thereof; and
    a passageway connected between the inlet pipe and the filtering chamber, wherein said water exiting the aerobic chamber joins the contaminated water from the aquarium tank to flow to the filtering chamber.

3. A filter as claimed in claim 2, further comprising dispersion means covering the aerobic chamber for providing more uniform trickling of the water, received from the first spillway, into the aerobic chamber.

4. The filter as claimed in claim 2, wherein the aerobic chamber includes an inner compartment having a plurality of holes on said compartment for allowing water to flow out of the compartment and to enter the housing after trickling through the aerobic chamber.

5. The filter as claimed in claim 4, wherein the inner compartment further includes a plurality of apertures to expose the aerobic medium to air.

6. The filter of claim 2, wherein the means for delivering includes a collar slidably positioned around the inlet pipe to control water level in the outer compartment, and wherein water flows back through the hole in the base of the inlet pipe to the filter chamber at a rate determined by the collar.

7. The filter as claimed in claim 2, further comprising a valve located on a top end of the inlet pipe for regulating the inflow of aquarium water.

8. The filter as claimed in claim 1, wherein the physical filter is comprised of:
    a strainer;
    a coarse sponge; and
    a filter cartridge all in alignment throughout the filtering chamber.

9. The filter as claimed in claim 1, wherein the medium within the aerobic chamber is thermoplastic tubules.

10. An aerobic filter means for biological filtration of contaminated aquarium water in an aquarium tank in combination with a filter means for physical filtration of aquarium water, the combination comprising:
    means for positioning both the aerobic filter means and filter means for physical filtration entirely on an exterior side wall of the aquarium tank;
    means for conducting the water exiting the filter means for physical filtration to both the aquarium tank and the aerobic filter means, said means for conducting being positioned on a top side of the filter means; and
    means for drawing water from the aquarium tank and delivering the water drawn to the filter means for physical filtration, wherein the means for drawing also collects water filtered by the aerobic filter means and delivers the filtered water directly to the filter means for physical filtration for being physically filtered an additional time.

11. A combination filter as claimed in claim 10, wherein the means for conducting comprises first and second spillways, the first spillway is positioned to overhang the aquarium tank for conducting water back to the aquarium tank by gravity flow and the second spillway is positioned to overhang the aerobic filter for conducting water to the aerobic filter by gravity flow.

12. A combination filter as claimed in claim 11, wherein the means for conducting comprises an inlet tube, a passageway connected at a base of the inlet tube and a pump means also connected at the base of the inlet tube, and wherein aquarium water is pumped into the inlet tube by the pump means and delivered to the filter for physical filtration through the passageway.

13. A combination filter as claimed in claim 12, wherein the inlet tube includes a hole at its base and a floating collar slidably positioned around the inlet tube for regulating the flow of water from the aerobic filter through the hole and into the inlet tube for delivery to the filter for physical filtration.

14. The combination of claim 13, wherein a medium for supporting bacteria growth is positioned in the aerobic filter so water entering the aerobic filter passes through the medium.

15. The combination filter of claim 14, further comprising dispersion means positioned on a top side of the aerobic filter for distributing the flow of water conducted to the aerobic filter providing more uniform trickling through the medium.

* * * * *